US006689835B2

(12) United States Patent
Amarasekera et al.

(10) Patent No.: US 6,689,835 B2
(45) Date of Patent: Feb. 10, 2004

(54) CONDUCTIVE PLASTIC COMPOSITIONS AND METHOD OF MANUFACTURE THEREOF

(75) Inventors: Jayantha Amarasekera, Clifton Park, NY (US); Kim Balfour, Delanson, NY (US); Christian Lietzau, Delmar, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/683,069

(22) Filed: Nov. 15, 2001

(65) Prior Publication Data

US 2002/0183438 A1 Dec. 5, 2002

Related U.S. Application Data

(60) Provisional application No. 60/287,127, filed on Apr. 27, 2001.

(51) Int. Cl.[7] .................................................. C08K 3/04
(52) U.S. Cl. .................. 524/495; 524/494; 524/496
(58) Field of Search ............................ 524/495, 496, 524/494

(56) References Cited

U.S. PATENT DOCUMENTS

| | | | | |
|---|---|---|---|---|
| 3,852,113 A | * | 12/1974 | Yokota ........................ 136/83 |
| 4,005,053 A | | 1/1977 | Briggs et al. ......... 260/33.6 AQ |
| 4,565,684 A | | 1/1986 | Tibbetts et al. .......... 423/447.3 |
| 4,572,813 A | | 2/1986 | Arakawa ................... 264/29.2 |
| 4,663,230 A | | 5/1987 | Tennent ...................... 428/367 |
| 4,749,451 A | * | 6/1988 | Naarmann ................. 204/58.5 |
| 4,816,289 A | | 3/1989 | Komatsu et al. ......... 423/447.3 |
| 4,876,078 A | | 10/1989 | Arakawa et al. ......... 423/447.3 |
| 5,024,818 A | | 6/1991 | Tibbetts et al. ............. 422/158 |
| 5,036,580 A | * | 8/1991 | Fox ............................. 29/605 |
| 5,165,909 A | | 11/1992 | Tennent et al. .......... 423/447.3 |
| 5,256,335 A | * | 10/1993 | Byrd .......................... 252/500 |
| 5,300,553 A | * | 4/1994 | Yamanashi et al. ......... 524/496 |
| 5,354,607 A | * | 10/1994 | Swift .......................... 428/294 |
| 5,445,327 A | | 8/1995 | Creehan ....................... 241/22 |
| 5,484,837 A | | 1/1996 | Kung et al. ................. 524/495 |
| 5,556,892 A | | 9/1996 | Pekala ........................ 521/181 |
| 5,566,892 A | | 10/1996 | Creehan |
| 5,589,152 A | | 12/1996 | Tennent et al. .......... 423/447.3 |
| 5,591,312 A | | 1/1997 | Smalley ................. 204/157.41 |
| 5,591,382 A | | 1/1997 | Nahass et al. |
| 5,591,832 A | | 1/1997 | Koshijima et al. .......... 530/500 |
| 5,641,455 A | | 6/1997 | Rosenlund et al. |
| 5,643,502 A | | 7/1997 | Nahass et al. |
| 5,643,990 A | | 7/1997 | Uehara et al. |
| 5,651,922 A | | 7/1997 | Nahass et al. |
| 5,654,357 A | | 8/1997 | Menashi et al. ............ 524/495 |
| 5,718,995 A | * | 2/1998 | Eichorst ....................... 430/39 |
| 5,744,235 A | | 4/1998 | Creehan ...................... 428/364 |
| 5,830,326 A | | 11/1998 | Iijima |
| 5,872,177 A | | 2/1999 | Whitehouse ................ 524/495 |
| 5,919,429 A | | 7/1999 | Tanaka et al. .......... 423/445 B |
| 6,183,714 B1 | | 2/2001 | Smalley et al. .......... 423/447.3 |
| 6,344,513 B1 | * | 2/2002 | Numata ...................... 524/496 |

FOREIGN PATENT DOCUMENTS

EP 0 198 558 A2 4/1986

OTHER PUBLICATIONS

"Conductive Plastics for Medical Applications" Medical Device & Diagnostic Industry Magazine MDDI Article Index, Jan. 1999, http://devicelink.com/mddl/archive/99/01/009.html. pp. 1–11.

Miller, "Tiny graphite 'tubes' create high–efficiency conductive plastics" Conductive Plastics, Plastic World magazine article: (reprinted by permission), http://www-.fibris.com/conplasl/html. pp. 1–5 Jan. 18, 2001.

"Unique Slough Resistant SRTM Series ESD Thermoplastic Product Line Offers Reduced Particle Contamination For Demanding Electronic Applications", Hyperion Catalysis International. http://www.fibrils.com/e5d.htm.

M.S.P. Shaffer, et al. "Dispersions of Carbon Nanotubes: Polymeric Analogies". Department of Materials Science, Cambridge University, pp. 24–27.

Shaffer et al. "Dispersions of Carbon Nanotubes: Polymeric Analogies" Proc. Polymer 1999, Department of Materials Science Cambridge University, pp 24–27.

Collins et al. "Controlling the Electronic Properties of Carbon Nanotube Bundles" Abstract only (BM Research Division, T.J. Watson Research Center, Yorktown Heights, New York 10598, USA www.nanotube.org/Abstracts/CollinsP.html.

Tesner et al. "Formation of Carbon Fibers From Acetylene" Carbon, 1970, Vol 8 pp. 435–422, Bergamon Press.

* cited by examiner

*Primary Examiner*—Edward J. Cain

(57) ABSTRACT

An improved, conductive, polymeric composition comprises a polymeric resin; an electrically conductive filler system comprising small carbon fibers and either carbon powder or fibrous non-conductive filler or a combination of both. The amount of the conductive filler system utilized is dependent upon the desired electrical conductivity (surface and volume conductivity or resistivity) while preferably preserving intrinsic properties of the polymeric resin such as impact, flex modulus, class A finish, and the like. The conductive articles made from these compositions can therefore be used for electromagnetic shielding, electrostatic dissipation or antistatic purposes in packaging, electronic components, housings for electronic components and automotive housings.

27 Claims, 3 Drawing Sheets

CONDUCTIVE PLASTIC COMPOSITIONS AND METHOD OF MANUFACTURE THEREOF

CROSS REFERENCE TO RELATED APPLICATIONS

This application claims the benefit of U.S. Provisional Application Serial No. 60/287,127 filed Apr. 27, 2001.

BACKGROUND OF INVENTION

Plastic (polymeric resin) is often the material of choice for components in electronic products such as computers, photocopiers, and the like because it offers design flexibility, cost-effective manufacturing, and light weight products. In order to function efficiently in such applications, normally insulating polymeric resin must be made electrically conductive to provide electromagnetic shielding, electrostatic dissipation or antistatic properties to such components.

Polymeric resins are typically made conductive by incorporating electrically conductive fillers such as carbon fibers, metal powders or flakes, vapor grown carbon fibers, carbon nanotubes, carbon black, and the like. However, the incorporation of carbon fibers having diameters greater than about 3 micrometers is detrimental to other properties such as the impact and surface finish of the composite. Metal powders and flakes greatly increase the specific gravity of polymeric compositions, making them less cost effective, while the use of carbon black can lead to components that exhibit sloughing. In recent years vapor grown carbon fibers (VGCF) and carbon nanotubes having diameters less than 75 nanometers have been found to maintain electrical conductivity while minimizing those problems associated with other conductive fillers. However the high cost of VGCF/carbon nanotubes makes the development of improved, cheaper, conductive polymeric composites important.

SUMMARY OF INVENTION

An improved, conductive, polymeric composition comprises a polymeric resin; and an electrically conductive filler system comprising small carbon fibers and carbon powder, fibrous non-conductive filler or a combination of carbon powder and fibrous non-conductive filler. The amount of the electrically conductive filler system utilized is dependent upon the desired electrical conductivity (surface and volume conductivity or resistivity) while preferably preserving intrinsic properties of the polymeric resin such as impact, flex modulus, class A finish, and the like. The conductive articles made from these compositions can therefore be used for electromagnetic shielding, electrostatic dissipation or antistatic purposes in packaging, electronic components, housings for electronic components and automotive housings.

BRIEF DESCRIPTION OF DRAWINGS

Referring now to the Figures, which are meant to be exemplary, not limiting.

DETAILED DESCRIPTION

Figure 1:
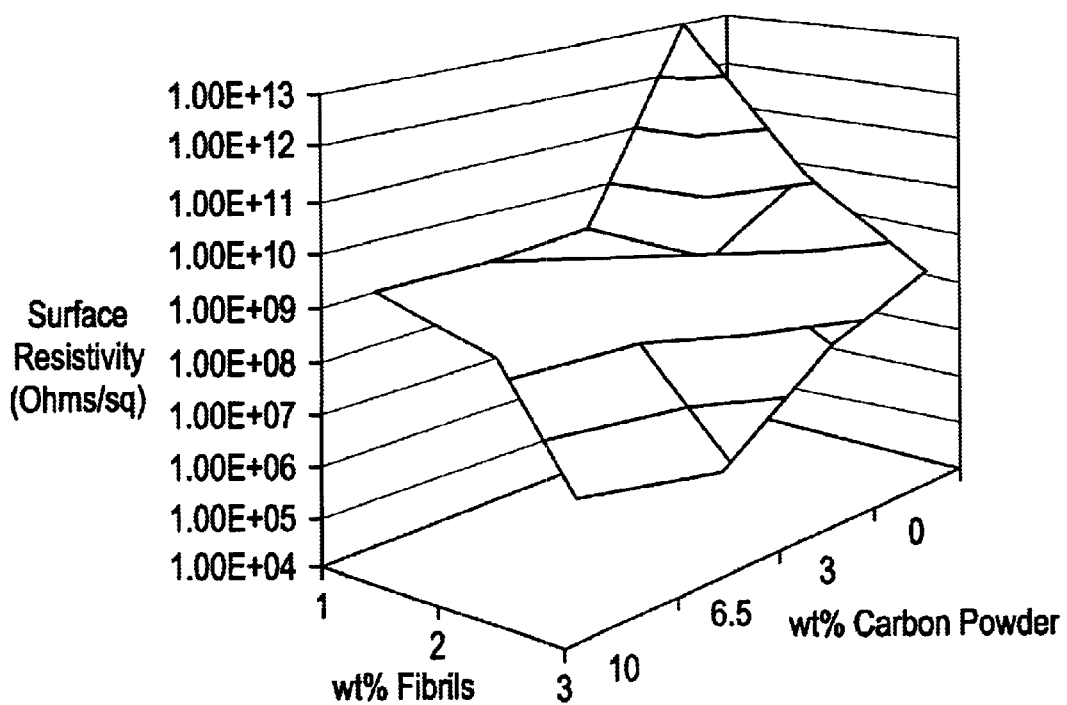
FIG. 1 is a three dimensional graph showing the effect of carbon powder-small carbon fiber interaction in polycarbonate on surface resistivity.

It has been unexpectedly found by the inventors hereof that an electrically conductive filler system comprising small carbon fibers and carbon powders, fibrous non-conductive fillers, or both, can be used to impart increased electrical conductivity to polymeric resins while maintaining properties such as impact strength, flexural modulus, shrinkage, class A finish, and the like in injection molded products. Small carbon fibers as defined herein may be either vapor grown carbon fibers or carbon nanotubes or a combination of both. In particular, it has been found that by adding either carbon powder or glass fibers or a combination of both with small carbon fibers to a polymeric resin, the electrical conductivity of the composition and its advantageous physical properties are maintained, while the weight percent (wt %) of small carbon fibers in the composition is substantially reduced. For example, the small carbon fiber concentration can be reduced up to about 85 wt % by the addition of up to about 25 wt % carbon powder without significant loss of electrical conductivity.

The polymeric resin used in the conductive compositions may be selected from a wide variety of thermoplastic resins and elastomers, blends of thermoplastic resins or thermoset resins. Specific nonlimiting examples of suitable thermoplastic resins include polyacetal, polyacrylic, styrene acrylonitrile, acrylonitrile-butadiene-styrene (ABS), polycarbonate, polystyrene, polyethylene, polypropylene, polyethylene terephthalate, polybutylene terephthalate, nylons (nylon-6, nylon-6/6, nylon-6/10, nylon-6/12, nylon-11 or nylon-12), polyamideimide, polyarylate, polyurethane, ethylene propylene diene rubber (EPR), ethylene propylene diene monomer (EPDM), polyarylsulfone, polyethersulfone, polyphenylene sulfide, polyvinyl chloride, polysulfone, polyetherimide, polytetrafluoroethylene, fluorinated ethylene propylene, perfluoroalkoxyethylene, polychlorotrifluoroethylene, polyvinylidene fluoride, polyvinyl fluoride, polyetherketone, polyether etherketone, polyether ketone ketone, and mixtures comprising any one of the foregoing thermoplastics.

Specific nonlimiting examples of blends of thermoplastic resins include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleicanhydride/acrylonitrile-butadiene-styrene, polyether etherketone/polyethersulfone, polyether etherketone/polyetherimide polyethylene/nylon, polyethylene/polyacetal, and the like.

Specific nonlimiting examples of thermosetting resins include polyurethane, natural rubber, synthetic rubber, epoxy, phenolic, polyesters, polyamides, silicones, and mixtures comprising any one of the foregoing thermosetting resins. Blends of thermoset resins as well as blends of thermoplastic resins with thermosets can be utilized.

Polymeric resins are generally used in amounts of greater than or equal to about 10, preferably greater than or equal to about 30, and more preferably greater than or equal to about 40 weight percent (wt %) of the total composition. The polymeric resins are furthermore generally used in amounts of less than or equal to about 99, preferably less than or equal to about 85, and more preferably less than or equal to about 80 wt % of the total weight of the composition.

As stated above, "small carbon fibers" as used herein refers to graphitized or partially graphitized vapor grown carbon fibers and/or carbon nanotubes. Graphitic or partially graphitic vapor grown carbon fibers (VGCF) having "tree-ring" or "fishbone" structures with diameters of about 3.5 to about 2000 nanometers (nm) and aspect ratios greater than or equal to about 5 may be used. When VGCF are used, diameters of about 1, preferably about 3.5 to about 70 nm are preferred, with diameters of about 3.5 to about 50 nm being more preferred. It is also preferable to have average aspect ratios greater than or equal to about 100 and more preferably greater than or equal to about 1000. The VGCF may or may not contain embedded catalyst particles utilized in their production. Representative VGCF are described in, for example, U.S. Pat. Nos. 4,565,684 and 5,024,818 to Tibbetts et al.; U.S. Pat. No. 4,572,813 to Arakawa; U.S. Pat. Nos. 4,663,230 and 5,165,909 to Tennent; U.S. Pat. No. 4,816,289 to Komatsu et al.; U.S. Pat. No. 4,876,078 to Arakawa et al.; U.S. Pat. No. 5,589,152 to Tennent et al.; U.S. Pat. No. 5,591,382 to Nahass et al and EP 1 98 558 to Geus.

In general, VGCF are used in an amount greater than or equal to about 0.25, preferably greater than or equal to about 0.5, more preferably greater than or equal to about 1 wt %, based on the total composition. VGCF are furthermore generally present at less than or equal to about 30, preferably less than or equal to about 10, and more preferably less than or equal to about 8 wt %, based on the total weight of the composition.

Carbon nanotubes, in contrast, are presently produced by laser-evaporation of graphite or carbon arc synthesis, yielding fullerene-related structures that consist of graphene cylinders that may be open, or closed at either end with caps containing pentagonal and/or hexagonal rings. Nanotubes may consist of a single wall wherein the tube diameter is about 0.7 to about 2.4 nm, or have multiple, concentrically arranged walls wherein the tube diameter is from about 2 to about 50 nm. When carbon nanotubes are used it is preferred to have an average aspect ratio greater than or equal to about 5, preferably greater than or equal to about 100, more preferably greater than or equal to about 1000. Representative carbon nanotubes are described in U.S. Pat. No. 6,183,714 to Smalley et al, U.S. Pat. No. 5,591,312 to Smalley, U.S. Pat. No. 5,641,455 to Ebbesen et al, U.S. Pat. No. 5,830,326 to Iijima et al, U.S. Pat. No. 5,591,832 to Tanaka et al, U.S. Pat. No. 5,919,429 to Tanaka et al.

In general, carbon nanotubes are used in an amount of greater than or equal to about 0.025, preferably greater than or equal to about 0.05, and more preferably greater than or equal to about 0.1 wt %, based on the total weight of the composition. The carbon nanotubes are furthermore present in amounts of less than or equal to about 30 wt %, preferably less than or equal to about 10 wt %, more preferably less than or equal to about 8 wt %, based on the total weight of the composition.

The small carbon fibers are used together with carbon powder or glass fibers, or a combination of the two. Suitable carbon powders (carbon black) are those capable imparting electrical conductivity to polymeric resins. Preferred carbon blacks are those having average particle sizes less than about 200 nm, preferably less than about 100 nm, more preferably less than about 50 nm. Preferred conductive carbon blacks may also have surface areas greater than about 200 square meter per gram ($m^2/g$), preferably greater than about 400 $m^2/g$, yet more preferably greater than about 1000 $m^2/g$. Preferred conductive carbon blacks may have a pore volume (dibutyl phthalate absorption) greater than about 40 cubic centimeters per hundred grams ($cm^3/100$ g), preferably greater than about 100 $cm^3/100$ g, more preferably greater than about 150 $cm^3/100$ g. The carbon black preferably has low ionic content (chlorides, sulfates, phosphates, fluorides, and nitrates) of about 4 parts per million per gram (ppm/g) or less, with about 2 ppm/g or less more preferred, about 1 ppm/g or less even more preferred, and about 0.5 ppm/g or less especially preferred. Exemplary carbon powders include the carbon black commercially available from Columbian Chemicals under the trade name Conductex®; the acetylene black available from Chevron Chemical, under the trade names S.C.F. (Super Conductive Furnace) and E.C.F. (Electric Conductive Furnace); the carbon blacks available from Cabot Corp. under the trade names Vulcan XC72 and Black Pearls; and the carbon blacks commercially available from Akzo Co. Ltd under the trade names Ketjen Black EC 300 and EC 600.

In general, conductive carbon blacks are used in an amount of greater than or equal to about 0.25, preferably greater than or equal to about 0.5, and more preferably greater than or equal to about 1.0 wt %, based on the total weight of the composition. The conductive carbon blacks are furthermore present in amounts of less than or equal to about 25 wt %, preferably less than or equal to about 20 wt %, and more preferably less than or equal to about 15 wt %, based on the total weight of the composition.

When present, the fibrous, non-conductive filler is selected from those that will impart improved properties to polymeric composites, and that have an aspect ratio greater than 1. As used herein, "fibrous" fillers may therefore exist in the form of whiskers, needles, rods, tubes, strands, elongated platelets, lamellar platelets, ellipsoids, micro fibers, nanofibers and nanotubes, elongated fullerenes, and the like. Where such fillers exist in aggregate form, an aggregate having an aspect ratio greater than 1 will also suffice for the purpose of this invention. Examples of such fillers well known in the art include those described in "Plastic Additives Handbook, $5^{th}$ Edition" Hans Zweifel, Ed, Carl Hanser Verlag Publishers, Munich, 2001. Non-limiting examples of suitable fibrous fillers include short inorganic fibers, including processed mineral fibers such as those derived from blends comprising at least one of aluminum silicates, aluminum oxides, magnesium oxides, and calcium sulfate hemihydrate, boron fibers, ceramic fibers such as silicon carbide, and fibers from mixed oxides of aluminum, boron and silicon sold under the trade name NEXTEL® by 3M Co., St. Paul, Minn., USA. Also included among fibrous fillers are single crystal fibers or "whiskers" including silicon carbide, alumina, boron carbide, iron, nickel, copper. Fibrous fillers such as glass fibers, basalt fibers, including textile glass fibers and quartz may also be included.

Also included are natural organic fibers known to those skilled in the art, including wood flour obtained by pulverizing wood, and fibrous products such as cellulose, cotton, sisal, jute, cloth, hemp cloth, felt, and natural cellulosic fabrics such as Kraft paper, cotton paper and glass fiber containing paper, starch, cork flour, lignin, ground nut shells, corn, rice grain husks and mixtures comprising at least one of the foregoing.

In addition, organic reinforcing fibrous fillers and synthetic reinforcing fibers may be used. This includes organic polymers capable of forming fibers such as polyethylene terephthalate, polybutylene terephthalate and other polyesters, polyarylates, polyethylene, polyvinylalcohol, polytetrafluoroethylene, acrylic resins, high tenacity fibers with high thermal stability including aromatic polyamides, polyaramid fibers such as those commercially available from Du Pont de Nemours under the trade name Kevlar, polybenzimidazole, polyimide fibers such as those available from Dow Chemical Co. under the trade names polyimide 2080 and PBZ fiber, polyphenylene sulfide, polyether ether ketone, polyimide, polybenzoxazole, aromatic polyimides or polyetherimides, and the like. Combinations of any of the foregoing fibers may also be used.

Such reinforcing fillers may be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture. Typical cowoven structures include glass fiber-carbon fiber, carbon fiber-aromatic polyimide (aramid) fiber, and aromatic polyimide fiber-glass fiber. Fibrous fillers may be supplied in the form of, for example, rovings, woven fibrous reinforcements, such as 0–90 degree fabrics, non-woven fibrous reinforcements such as continuous strand mat, chopped strand mat, tissues, papers and felts and 3-dimensionally woven reinforcements, performs and braids.

In general, the amount of fibrous filler present in the composition can be up to about 50 wt %, and preferably from about 0 to about 20 wt %, based on the total weight of the composition.

In a preferred embodiment, glass fibers are used as the non-conductive fibrous fillers to improve conductivity in these applications. Useful glass fibers can be formed from any type of fiberizable glass composition known to those skilled in the art, and include those prepared from fiberizable glass compositions commonly known as "E-glass," "A-glass," "C-glass," "D-glass," "R-glass," "S-glass," as well as E-glass derivatives that are fluorine-free and/or boron-free. Most reinforcement mats comprise glass fibers formed from E-glass and are included in the conductive compositions of this invention. Such compositions and methods of making glass filaments therefrom are well known to those skilled in the art.

Commercially produced glass fibers generally having nominal filament diameters of about 4.0 to about 35.0 micrometers, and most commonly produced E-glass fibers having nominal filament diameters of about 9.0 to about 30.0 micrometers may be included in the conductive compositions. The filaments are made by standard processes, e.g., by steam or air blowing, flame blowing, and mechanical pulling. The preferred filaments for plastics reinforcement are made by mechanical pulling. Use of non-round fiber cross section is also possible. The glass fibers may be sized or unsized. Sized glass fibers are conventionally coated on at least a portion of their surfaces with a sizing composition selected for compatibility with the polymeric matrix material. The sizing composition facilitates wet-out and wet-through of the matrix material upon the fiber strands and assists in attaining desired physical properties in the composite.

The glass fibers are preferably glass strands that have been sized. In preparing the glass fibers, a number of filaments can be formed simultaneously, sized with the coating agent and then bundled into what is called a strand. Alternatively the strand itself may be first formed of filaments and then sized. The amount of sizing employed is generally that amount which is sufficient to bind the glass filaments into a continuous strand and ranges from about 0.1 to about 5 wt %, and more typically ranges from about 0.1 to 2 wt % based on the weight of the glass fibers. Generally, this may be about 1.0 wt % based on the weight of the glass filament. Glass fibers in the form of chopped strands about one-fourth inch long or less and preferably about one-eighth inch long may also be used. They may also be longer than about one-fourth inch in length if desired.

In general, the glass fibers are present in the composition in an amount of up to about 50 wt % based on the total weight of the composition, and preferably from about 0 to about 20 wt %, based on the total weight of the composition.

Although the relative quantities of polymeric resin, small carbon fibers and either carbon powder and/or fibrous, non-conductive filler are set forth above in general terms, the precise quantities will depend on the particular resin, small carbon fiber, carbon powder, and fibrous non-conductive filler, as well as the desired conductivity and physical properties of the final composition. However, the amount of carbon powder and/or fibrous non-conductive filler is preferably an amount effective to retain the electrical conductivity (surface and/or volume conductivity) while at the same time reducing the required concentration of small carbon fiber concentration in the composition by about 20 wt % or more, with a reduction of about 35 wt % or more preferred, a reduction of about 50 wt % or more even more preferred, and a reduction of up to about 85 wt % or so especially preferred (based upon the small carbon fiber concentration to attain the same surface resistivity without the use of the carbon powder or fibrous non-conductive fibers).

Figure 2:
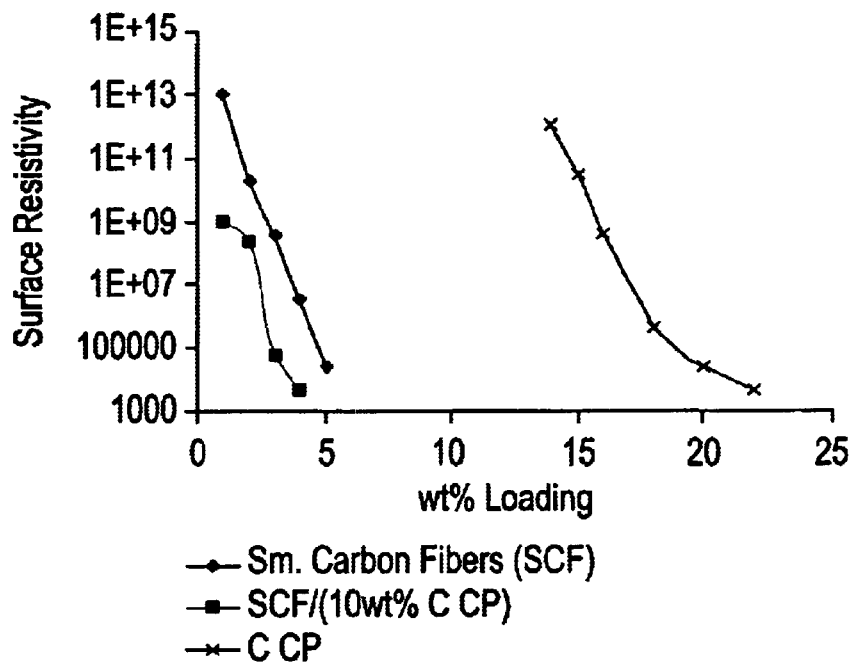
FIG. 2 is a graph of surface conductivity of polycarbonate resin containing small carbon fibers and carbon powder.

For example, from FIG. 1 it can be seen that the addition of 3 wt % of carbon powder to polycarbonate resin containing 1 wt % small carbon fibers produces a surface resistivity similar to the polymeric resin containing only 2 wt % small carbon fibers. Similarly FIG. 2 shows that the addition of approximately about 5 wt % small carbon fibers (Sm. Carbon Fibers (SCF)) to polycarbonate resin produces a surface resistivity of $10^5$ ohm/square. A similar surface resistivity can be obtained when approximately about 18 wt % of carbon powder (C CP) alone is used. If however, about 3 wt % small carbon fibers are combined with about 10 wt % carbon powder in polycarbonate resin (SCF/(10 wt % C CP)), then the same surface resistivity is attainable. Thus, synergy between conductive components helps achieve the same surface resistivity while reducing their concentration.

Figure 3:
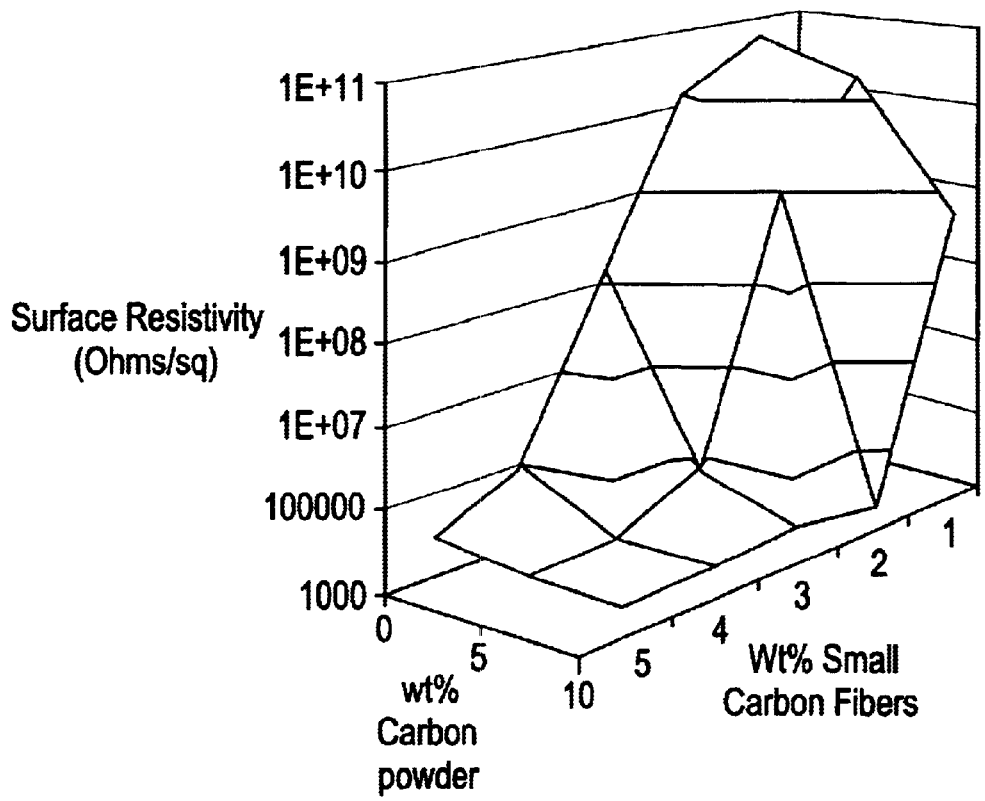
FIG. 3 is a three dimensional graph showing the effect of carbon powder-small carbon fiber interaction in polybutylene terephthalate on surface resistivity.
Figure 4:
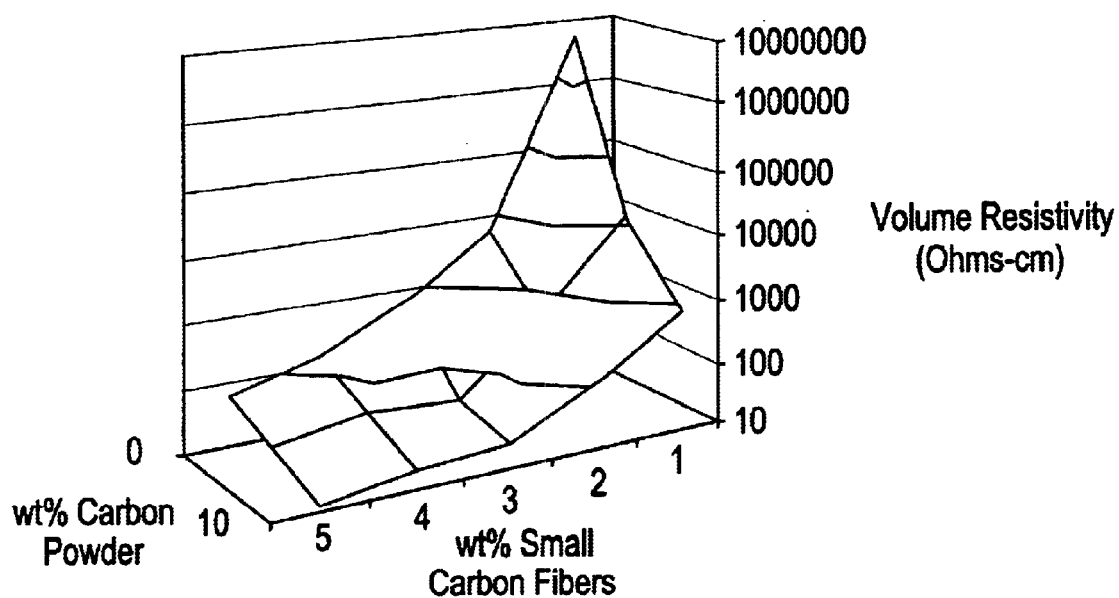
FIG. 4 is a three dimensional graph showing volume resistivity versus percent carbon power and small carbon fibers in polybutylene terephthalate.

FIGS. 3 and 4 demonstrate a similar synergy between small carbon fibers and carbon powder in polybutylene terephthalate resin that consequently improves both the surface and volume resistivity of the composition.

Similarly when glass fibers are added to a polymeric resin containing small carbon fibers, the electrical conductivity of the composite is increased depending upon the concentration of glass fibers as demonstrated in Examples 1 and 2 below. This allows the development of cost-efficient, electrostatic dissipative, surface conductive, non-contaminating polymeric molding compositions with little or no warp and excellent dimensional stability. Thus by employing carbon powder and/or glass fibers in a composition comprising polymeric resin and small carbon fibers, the amount of small carbon fibers can be reduced while maintaining surface and volume resistivity.

Optional additives may also be present in the conductive composition. For example, a coupling agent such as sodium or zinc stearate or an epoxy, including, but not limited to, 3,4-epoxy cyclohexylmethyl-3,4-epoxy cyclohexane-carboxylate, epoxidized soy bean oil, and mixtures comprising at least one of the foregoing coupling agents, among others, can be used to improve impact and hydrolytic resistance, tab-bending performance, and other characteristics of the molded composition.

Additionally, the composition may optionally also contain additives such as antioxidants, such as, for example, organophosphites, for example, tris(nonyl-phenyl) phosphite, tris(2,4-di-t-butylphenyl)phosphite, bis(2,4-di-t-butylphenyl) pentaerythritol diphosphite or distearyl pentaerythritol diphosphite, alkylated monophenols, polyphenols and alkylated reaction products of polyphenols with dienes, such as, for example, tetrakis[methylene(3,5-di-tert-butyl-4-hydroxyhydrocinnamate)] methane, 3,5-di-tert-butyl-4-hydroxyhydrocinnamate, octadecyl 2,4-di-tert-butylphenyl phosphite, butylated reaction products of para-cresol and dicyclopentadiene, alkylated hydroquinones, hydroxylated thiodiphenyl ethers, alkylidene-bisphenols, benzyl compounds, esters of beta-(3,5-di-tert-butyl-4-hydroxyphenyl)-propionic acid with monohydric or polyhydric alcohols, esters of beta-(5-tert-butyl-4-hydroxy-3-methylphenyl)-propionic acid with monohydric or polyhydric alcohols; esters of thioalkyl or thioaryl compounds, such as, for example, distearylthiopropionate, dilaurylthiopropionate, ditridecylthiodipropionate, amides of beta-(3,5-di-tert-butyl-4-hydroxyphenyl)-propionic acid; fillers and reinforcing agents, such as, for example, silicates, $TiO_2$, calcium carbonate, talc, mica and other additives such as, for example, mold release agents, UV absorbers, stabilizers such as light stabilizers and others, lubricants, plasticizers, pigments, dyes, colorants, anti-static agents, blowing agents, flame retardants, impact modifiers, among others, as well as combinations comprising at least one of the foregoing additives.

In the processing of such conductive composites, the polymeric resin along with the conductive components, optional non-conductive fibrous filler and additional additives may be compounded or melt blended in a commercially available melt blending production device such as, for example, an extruder, roll mill, dough mixer, and the like. The polymeric resin may be initially in the form of powder, strands or pellets and may be pre-compounded with either the small carbon fibers, carbon black or glass fibers in a Henschel mixer or any other type of mixer capable of imparting shear to the mixture so as to bring the components into intimate contact. The pre-compounded mixture may then be extruded at a suitable temperature into a strand that is quenched and pelletized. Alternately, the polymeric resin may be directly added to the extruder with the small carbon fibers, carbon black and glass fibers added either concurrently or sequentially into the extruder to form the conductive strand. The small carbon fibers, carbon black or the glass fibers may also be added to the extruder in concentrated masterbatch form as detailed in U.S. Pat. Nos. 5,445,327, 5,556,892 and 5,744,235 to Creehan, U.S. Pat. No. 5,872,177 to Whitehouse, U.S. Pat. No. 5,654,357 to Menashi et al, U.S. Pat. No. 5,484,837 to King et al, U.S. Pat. No. 4,005,053 to Briggs et al. Extruder temperature is generally sufficient to cause the polymeric resin to flow so that proper dispersion and wetting of the conductive and non-conductive fibrous filler may be achieved. The conductive pellets formed as a result of extrusion or conductive sheet obtained from a roll mill, is then subjected to a finishing or forming process such as injection molding, blow molding, vacuum forming and the like to form a usable conductive article.

In one embodiment, in one manner of proceeding, powdered polycarbonate resin is first blended with the masterbatch containing small carbon fibers in a Henschel high-speed mixer. Other low shear processes including but not limited to hand mixing may also accomplish this blending. The blend is then fed into the throat of a twin-screw extruder via a hopper. The glass may be incorporated into the composition by feeding unchopped strands or filaments directly into the extruder via a side feeder. The dispersed glass fibers are reduced in length as a result of the shearing action on the glass strands in the extruder barrel. The carbon black may also be compounded into a masterbatch with a desired polymeric resin and fed into the extruder either at the throat or through a side feeder. The extruder is generally operated at a temperature sufficient to cause the polymeric resin to flow. The extrudate is immediately quenched in a water batch and pelletized. The pellets so prepared when cutting the extrudate may be one-fourth inch long or less and contain finely divided uniformly dispersed glass fibers and small carbon fibers/carbon powder in the blend composition. The pellets are generally subjected to a forming or finishing process such as injection molding, blow molding, or vacuum forming to render a conductive article.

Conductive compositions made in this manner can be used for a variety of useful applications where electromagnetic shielding, electrostatic dissipation and antistatic properties are necessary such as in IC chip trays, electronic packaging, automotive exterior body panel applications, computer housings etc. The addition of glass helps maintain dimensional stability and prevent warping in such applications.

The invention is further described by the following non-limiting examples:

EXAMPLE 1

GTX 820 (a thermoplastic blend of nylon 6,6 and polyphenylene ether) from GE Plastics was blended in a 30 mm twin screw Werner and Pfleiderer extruder with nylon-6,6 masterbatch containing 20 wt % VGCF obtained from Hyperion Catalysis International. The GTX 820 was fed via a hopper at the throat of the extruder along with the nylon-6,6 masterbatch. For compositions containing glass fibers, chopped glass fibers were added to the extruder through a side feeder. The die temperature was set at 315° C. The extrudate was immediately quenched in a water bath and pelletized. The pellets were dried in an oven and injection molded into 4-inch diameter discs of 0.125 inch thickness on a 120 ton VanDorn injection molding machine. The surface resistivity was obtained using the Keithley Electrometer, high resistivity meter 6517A with the 8007 resistivity test fixture. Table 1 shows the measured surface resistivity for compositions 1–5, which contain no glass fibers compositions 7–10, which contain 20 wt % glass fibers (G5000 obtained from Owens Corning Fiber glass (OCF)) and compositions 11–13, which contain 15 wt % glass fibers. It can clearly be seen that with the addition of glass fibers, surface resistivity decreases significantly.

EXAMPLE 2

Lexan (polycarbonate) resin from GE Plastics was blended in a 30 mm twin screw Werner and Pfleiderer extruder with polycarbonate masterbatch containing VGCF obtained from Hyperion Catalysis International. The VGCF are present in an amount of about 15 wt % in the masterbatch. The Lexan along with the VGCF masterbatch are fed into the extruder through at the throat. The glass is fed into the extruder through a side feeder. The temperature of the die was set at 315° C. The extrudate was immediately quenched in a water bath and pelletized. The pellets were dried in an oven and injection molded into 4 inch diameter discs of 0.125" thickness on a 120 ton VanDorn injection molding machine. The surface resistivity was obtained using the Keithley Electrometer, high resistivity meter 6517A with the 8007 resistivity test fixture.

Table 2 shows measured surface resistivity for compositions 14–18, which contain no glass fibers, compositions 20–23, which contain 20 wt %/glass fibers (G1100 obtained from Owens Corning Fiber glass (OCF)), and compositions 24–25, which contain 15 wt % glass fibers. Again it can clearly be seen that with the addition of glass fibers, surface resistivity decreases significantly. For example, composition 17 containing 26.67 wt % of the polycarbonate masterbatch has a surface resistivity of $1.4 \times 10^{11}$ ohms/square while composition 23 and 24 containing 23.33 and 26.67 wt % polycarbonate masterbatch and 15 wt %/glass fibers have lower surface resistivities of $8.2 \times 10^9$ and $5.3 \times 10^7$ ohms/square respectively.

TABLE 1

| Composition | 1* | 2* | 3* | 4* | 5* | 7 | 8 | 9 | 10 | 11 | 12 | 13 |
|---|---|---|---|---|---|---|---|---|---|---|---|---|
| GTX 820 Blend (wt %) | 95 | 90 | 85 | 80 | 75 | 75 | 72.5 | 70 | 67.5 | 70 | 67.5 | 65 |
| G5000 Glass (wt %) | — | — | — | — | — | 20 | 20 | 20 | 20 | 15 | 15 | 15 |
| Nylon 6,6 Masterbatch (wt %) | 5 | 10 | 15 | 20 | 25 | 5 | 7.5 | 10 | 12.5 | 15 | 17.5 | 20 |
| Surface Resistivity (ohm/square) | $>10^{12}$ | $2.1 \times 10^{11}$ | $8.9 \times 10^7$ | $3.2 \times 10^5$ | $1.7 \times 10^5$ | $>10^{12}$ | $5 \times 10^{11}$ | $1.4 \times 10^8$ | $2 \times 10^7$ | $2.3 \times 10^6$ | $1.4 \times 10^6$ | $3.2 \times 10^5$ |

*Control Samples

TABLE 2

| Composition | 14* | 15* | 16* | 17* | 18* | 20 | 21 | 22 | 23 | 24 |
|---|---|---|---|---|---|---|---|---|---|---|
| Lexan resin (wt %) | 93.3 | 86.67 | 80 | 73.33 | 66.7 | 73.3 | 67.7 | 60 | 61.67 | 58.33 |
| G1100 Glass (wt %) | — | — | — | — | — | 20 | 20 | 20 | 15 | 15 |
| Polycarbonate Masterbatch (wt %) | 6.7 | 13.3 | 20 | 26.67 | 33.3 | 6.7 | 13.3 | 20 | 23.33 | 26.67 |
| Surface Resistivity (ohm/square) | $>10^{12}$ | $>10^{12}$ | $>10^{12}$ | $1.4 \times 10^{11}$ | $1.5 \times 10^7$ | $>10^{12}$ | $>10^{12}$ | $1 \times 10^{12}$ | $8.2 \times 10^9$ | $5.3 \times 10^7$ |

*Control Samples

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A conductive composition comprising:
   a thermoplastic polymeric resin;
   vapor grown carbon fibers;
   carbon black; and
   glass fibers.

2. The composition of claim 1, wherein the thermoplastic polymeric resin is selected from the group consisting of polyacetal, polyacrylic, polycarbonate, polyethylene terephthalate, polybutylene terephthalate, sulfonated polybutylene terephthalate, acrylonitrile-butadiene-styrene, polystyrene, polyethylene, polypropylene, polyamide, polyetherimide, polydimethylsiloxane, polyphenylene ether, polysulfones, polycarbonate-acrylonitrile-butadiene-styrene, polyamideimide, polyarylates, polyurethane, ethylene propylene rubber, ethylene propylene diene monomer, polyarylsulfone, polyethersulfone, polyvinyl chloride, polysulfone, polyetherimide, polytetrafluoroethylene, fluorinated ethylene propylene, perfluoroalkoxy, polychlorotrifluoroethylene, polyvinylidene fluoride, polyvinyl fluoride, polyetherketone, polyether etherketone, polyether ketone ketone and mixtures comprising at least one of the foregoing thermoplastic polymeric resins.

3. The composition of claim 1, wherein the vapor grown carbon fibers have a diameter between about 3.5 and about 2000 nm, an average aspect ratio greater than or equal to about 5, and comprise about 0.25 to about 30 wt % of the total composition.

4. The composition of claim 1, wherein the carbon black comprises about 0.25 to about 25 wt % of the total composition.

5. The composition of claim 1, wherein the glass fibers comprise about 0 to about 50 wt % of the total composition.

6. An electrically conductive composition comprising:
   a nylon-polyphenylene ether blend;
   vapor grown carbon fibers; and
   carbon black, glass fibers, or a mixture of carbon black and glass fibers.

7. The composition of claim 6, wherein the nylon-polyphenylene ether blend comprises about 10 to about 99 wt %, the vapor grown carbon fibers comprises about 0.25 to about 30 wt %, the carbon black comprises about 0.25 to about 25 wt % and the glass fibers comprise up to about 50 wt % of the total composition.

8. An electrically conductive composition comprising:
   a polycarbonate resin;
   vapor grown carbon fibers; and
   carbon black, glass fibers, or a mixture of carbon black and glass fibers.

9. A composition of claim 8, wherein the polycarbonate resin comprises about 10 to about 99 wt %, the vapor grown carbon fibers comprises about 0.25 to about 30 wt %, the carbon black comprises about 0.25 to about 25 wt % and the glass fibers comprise up to about 50 wt % of the total composition.

10. A conductive polymeric composition comprising:

a thermoplastic polymeric resin;

single wall carbon nanotubes;

carbon black; and glass fibers.

11. The composition of claim 10, wherein the thermoplastic polymeric resin is selected from the group consisting of polycarbonate, polybutylene terephthalate, sulfonated polybutylene terephthalate, acrylonitrile-butadiene-styrene, polystyrene, polypropylene, polyamide, polyether imide, polydimethylsiloxane, polyphenylene ether, polysulfones, polycarbonate-acrylonitrile-butadiene-styrene, and mixtures comprising at least one of the foregoing thermoplastic polymeric resins.

12. The composition of claim 10, wherein the single wall carbon nanotubes have a diameter between about 0.7 and about 2.4 nm, an average aspect ratio greater than or equal to about 5, and comprise about 0.025 to about 30 wt % of the total composition.

13. The composition of claim 10, wherein the carbon black comprises about 0.25 to about 25wt% of the total composition.

14. The composition of claim 10, wherein the glass fibers comprise about 0 to about 50wt% of the total composition.

15. A conductive, polymeric composition comprises:

a polymeric resin; and an electrically conductive filler system comprising carbon nanotubes and either carbon powder, fibrous non-conductive filler, or a combination of carbon powders and fibrous non-conductive filler.

16. The composition of claim 15, wherein the polymeric resin is a thermoplastic selected from the group consisting of polyacetal, polyacrylic, styrene acrylonitrile, acrylonitrile-butadiene-styrene, polycarbonate, polystyrene, polyethylene, polypropylene, polyethylene terephthalate, polybutylene terephthalate, polyamides, polyamideimide, polyarylates, polyurethane, ethylene propylene rubber, ethylene propylene diene monomer, polyarylsulfone, polyethersulfone, polyphenylene ether, polyphenylene sulfide, polyvinyl chloride, polysulfone, polyetherimide, polytetrafluoroethylene, fluorinated ethylene propylene, perfluoroalkoxy, polychlorotrifluoroethylene, polyvinylidene fluoride, polyvinyl fluoride, polyetherketone, polyether etherketone, polyether ketone ketone; and combinations comprising one of the foregoing thermoplastics or a thermoset selected from the group consisting of polyurethanes, natural rubber, synthetic rubber, epoxy, phenolic, polyesters, polyamides, silicones; and combinations comprising at least one of the foregoing thermosets.

17. The composition of claim 15, wherein the polymeric resin comprises a blend of a thermoplastic resin with a thermoset.

18. The composition of claim 15, wherein the polymeric resin comprises about 10 to about 99 wt % of the total composition.

19. The composition of claim 15, wherein the carbon nanotubes are selected from the group consisting of single wall carbon nanotubes, multiwall carbon nanotubes, and combinations comprising at least one of the foregoing carbon nanotubes.

20. The composition of claim 19, wherein the singe wall nanotubes have diameters of about 0.7 to about 2.4 nanometers and the multiwall carbon nanotubes have diameters of about 2 to about 50 nanometers.

21. The composition of claim 15, wherein the carbon nanotubes comprise about 0.025 to about 30 wt % of the total composition.

22. The composition of claim 15, wherein the carbon powder comprises about 0.25 to about 25 wt % of the total composition.

23. The composition of claim 15, wherein the carbon powder is carbon black.

24. The composition of claim 15, wherein the fibrous non-conductive filler is selected from the group consisting of aluminum silicates, aluminum oxides, magnesium oxides, calcium sulfate hemihydrate, boron fibers, ceramic fibers, silicon carbide, basalt fibers, silicon carbide, alumina, boron carbide, glass, quartz, wood flour, cellulose, cotton, sisal, jute, hemp cloth, felt, starch, cork flour, lignin, ground nut shells, corn, rice grain husks, polyethylene terephthalate fibers, polyvinylalcohol fibers, aromatic polyamide fibers, polybenzimidazole fibers, polyimide fibers, polyphenylene sulfide fibers, polyether ether ketone fibers, polybenzoxazole fibers, polyester fibers, polyethylene fibers, polytetrafluoroethylene fibers, polyacrylic fibers, polyvinyl alcohol fibers, aramid fibers and mixtures comprising at least one of the foregoing fibrous non-conducting fillers.

25. The composition of claim 15, wherein the fibrous non-conductive filler is glass fiber selected from the group consisting of E-glass, A-glass, C-glass, D-glass, R-glass, S-glass, and mixtures comprising at least one of the foregoing glass fibers.

26. The composition of claim 15, wherein the fibrous non-conductive filler comprises up to about 50 wt % of the total composition.

27. The composition of claim 15, wherein the fibrous non-conductive filler is glass fiber, present in an amounts of up to about 50 wt % of the total composition.

* * * * *